July 30, 1968     K. ABOLD     3,394,772
FUEL TANK FOR MOTOR VEHICLES, ESPECIALLY TRACTORS
Filed April 2, 1965
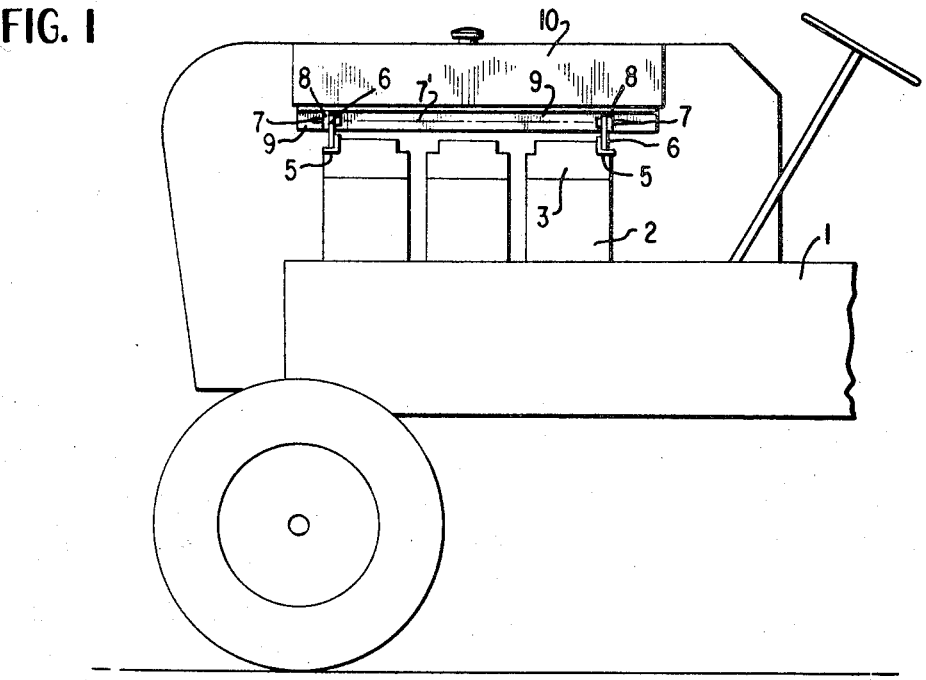
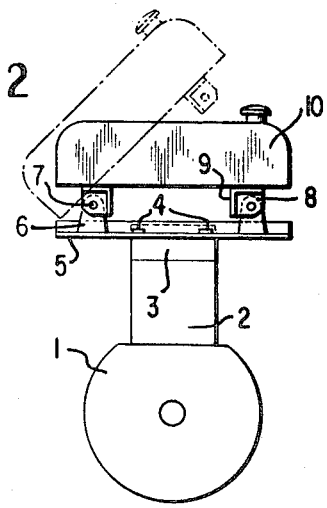
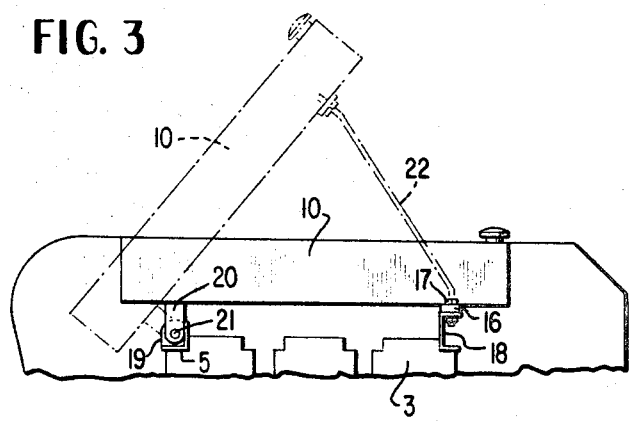
INVENTOR
Kaspar Abold
BY Dicke & Craig
ATTORNEYS.

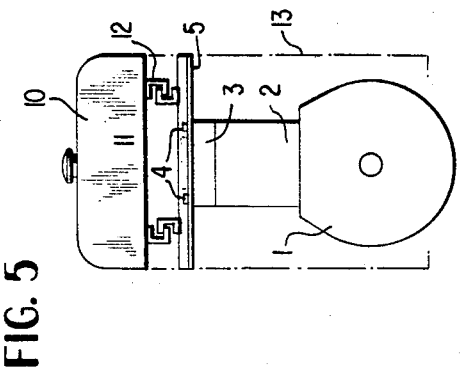
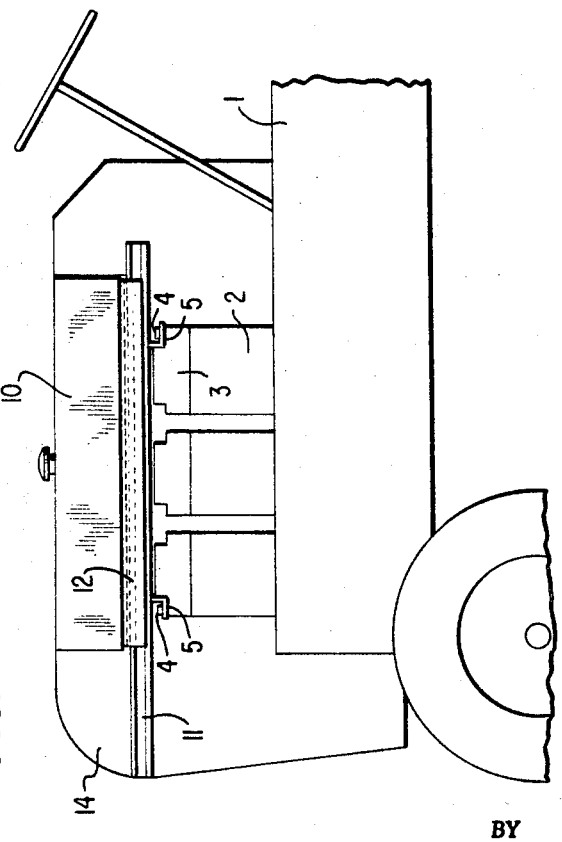
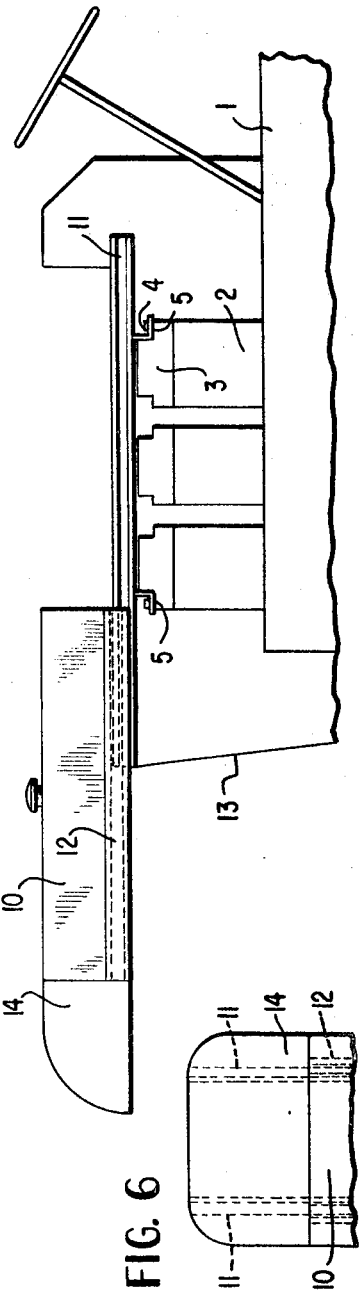
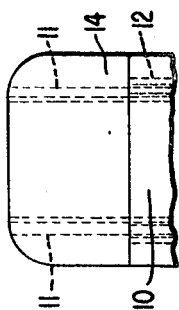

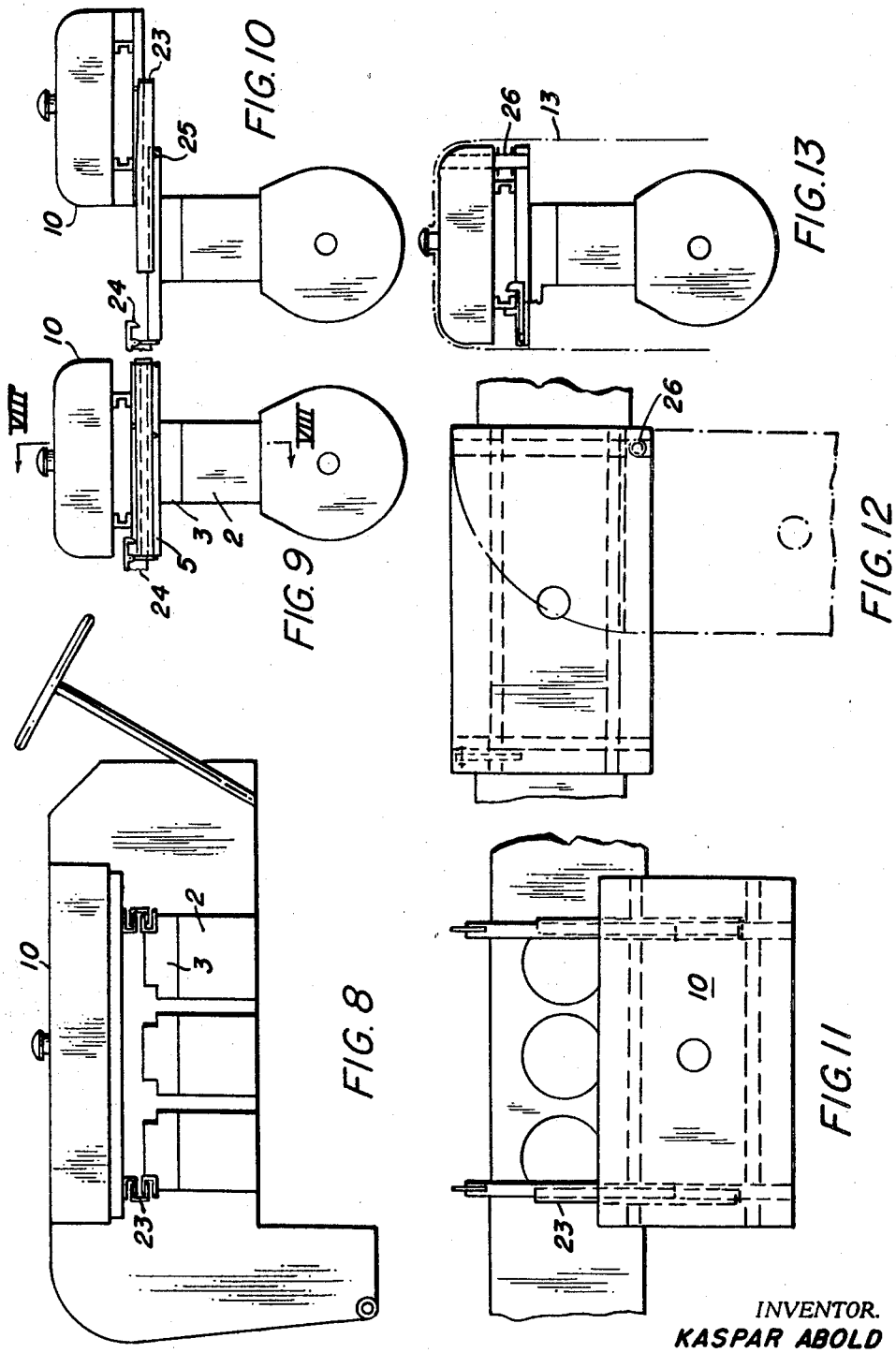

United States Patent Office 3,394,772
Patented July 30, 1968

3,394,772
FUEL TANK FOR MOTOR VEHICLES, ESPECIALLY TRACTORS
Kaspar Abold, Markt Oberdorf, Allgau, Bavaria, Germany, assignor to Xaver Fendt & Co., Markt Oberdorf, Bavaria, Germany
Filed Apr. 2, 1965, Ser. No. 445,205
16 Claims. (Cl. 180—69)

ABSTRACT OF THE DISCLOSURE

A motor vehicle, especially a tractor having a power train, including an engine with multiple cylinders and a transmission, aligned longitudinally parallel to the direction of motion of the vehicle, wherein the engine and the transmission are located forward of the rear axle of the tractor, said motor vehicle having a fuel tank structure and supporting means therefor, which movably support the tank structure above the power train so as to render the power train accessible temporarily. The supporting means may be in the form of pivot pins aligned longitudinally or transversely to the direction of motion in a horizontal plane, or in a vertical plane or as rail members upon which the fuel tank may slide. The invention further contemplates a fuel tank wherein the upper surface thereof has the configuration of the engine hood and simultaneously serves as the hood.

---

This invention relates to a motor vehicle, and more particularly to a tractor, with a fuel tank disposed above the engine or above some other part that can be made accessible temporarily.

Tractors have already been disclosed in which the fuel tank is disposed rigidly above the engine. Such an arrangement impairs engine servicing so that the fuel tank has to be released from its retaining means and has to be removed. This requires additional work and care on the part of the maintenance personnel, and is no simple task with engine bonnets or hoods that can usually be swung open only to a limited extent.

On the other hand, the provision of the fuel tank above the engine makes possible a short overall length which may be of advantage, particularly with tractors having high-powered engines, which are already relatively long because of the large number of cylinders.

The object of the present invention is so to dispose and arrange a fuel tank above the engine or above another part of the vehicle that, for example for maintenance purposes, it can be temporarily moved out of and back to the normal position thereof over a predetermined path, while it remains permanently connected to the vehicle. To this end, according to the present invention, the fuel tank is movably supported about or on pivots, spindles, rails or the like secured to the vehicle.

According to a preferred embodiment, the fuel tank is adapted to pivot outwards about a horizontal axis preferably parallel or perpendicular to the vehicle longitudinal axis.

According to another feature of the present invention, the fuel tank is adapted to pivot out sideways about a vertical axis.

According to still another feature of the present invention, the top part of the fuel tank is adapted to the profile or has the configuration of the bonnet or hood and at the same time forms a part thereof.

The arrangement according to the present invention, wherein the fuel tank can be swung or pivoted or slid out of its normal position therefore not only offers the advantage that the component requiring servicing, especially the engine, can be made readily accessible with few manipulations and little inconvenience but in addition thereto, the fuel tank remains permanently connected to the vehicle so that it resumes its initial position when it is swung or slid back, without any special care being required, and can be secured by means of readily detachable or releasable connecting elements. Furthermore, the appropriately profiled or shaped top part of the fuel tank replaces the top part of the engine bonnet or hood so that in addition to a reduction in the manufacturing costs the separate opening and closing of the bonnet is obviated.

Accordingly, it is an object of the present invention to provide a fuel tank arrangement for vehicles, especially tractors, which is simple in construction yet avoids the shortcomings and drawbacks encountered with the prior art arrangements.

Another object of the present invention resides in a fuel tank arrangement which eliminates the need for disassembly of the tank from the engine in case of repairs of the engine.

Another object of the present invention resides in the provision of a fuel tank in tractors which permits ready accessibility to the engine without necessitating removal of the fuel tank notwithstanding a fixed connection of the tank on the engine block.

Still another object of the present invention resides in the provision of a fuel tank adapted to be located above the engine which permits a relatively short overall length of the engine without necessitating disassembly of the tank in case of engine repairs.

These and further objects, features, and advantages of the present invention will become more obvious from the following description when taken in connection with the accompanying drawing which shows, for purposes of illustration only, several embodiments of the present invention and wherein:

FIG. 1 is a side view of the tractor with a fuel tank arrangement according to the present invention, which can swing laterally or to the side of the tractor;

FIG. 2 is a rear view of FIG. 1;

FIG. 3 is a side view of the tractor with a fuel tank in accordance with the present invention which is adapted to swing in the forward direction;

FIG. 4 is a side view of a modified embodiment of a fuel tank arrangement on a tractor according to the present invention which is displaceable in the longitudinal direction;

FIG. 5 is a rear view of the arrangement according to FIG. 4;

FIG. 6 is a top plan view on the front part of a tractor with the arrangement shown in FIG. 4, FIG. 7 shows the fuel tank arrangement according to FIG. 4 in the forwardly extended position, FIG. 8 is a side view of the tractor with a fuel tank arrangement which provides for sliding motion of the fuel tank in a direction transverse to the direction of motion of the tractor, FIG. 9 is a rear view of a tractor as shown in FIGURE 8, wherein the fuel tank is shown in its normal position, FIG. 10 is a rear view of a tractor as shown in FIGURE 8, wherein the fuel tank is shown in a position laterally displaced from its normal position, rendering the engine accessible, FIG. 11 is a top view of a tractor as shown in FIGURE 10, FIG. 12 is a top view of a tractor having a fuel tank supported on a vertical pivot pin at one corner of the fuel tank, thus providing for lateral pivoting of the fuel tank, and FIG. 13 is a rear view of a tractor as shown in FIGURE 12.

Referring now to the drawing wherein like reference numerals are used throughout the various views to designate like parts. FIG. 1 illustrates an example of the application of the present invention to a partially illustrated tractor in which an engine and a transmission 1 of conventional construction are disposed one behind the other in a known manner and the engine cylinders 2 are disposed vertically. Cross-members 5 are secured to the cylinder heads 3 of at least two cylinders 2, preferably the first and last cylinders, by means of the normally existing cylinder head bolts 4; each cross-member 5 is provided with the two bearing brackets 6 which are disposed transversely of the vehicle longitudinal axis and of which the two bearing brackets 6 which are located one behind the other on one side, for example, the left-hand side, are each provided with a pivot pin 7. The pivot pins 7 extend through bores in brackets 8 fitted or mounted on an angle rail 9 secured to the fuel tank 10 in parallel relationship to the vehicle longitudinal axis so that the tank 10 can be swung out to the left about the common axis 7' of the two pivot pins 7 as shown in FIG. 2. Another two brackets 8 are secured in the same way by means of an angle rail 9 on the right-hand side of the fuel tank 10 and are adapted to be connected by means of bolts, screws or the like, 15, to the bearing brackets 6 disposed on the cross-members 5. The two angle rails 9 serve simultaneously as a support and reinforcing means.

The fuel tank 10 can also be arranged so as to tilt in forward or rearward direction about a horizontal axis extending at right angles to the vehicle longitudinal axis. FIG. 3 shows an embodiment in which the fuel tank 10 is adapted to tilt forwards. In this embodiment, a cross-member 5 is again fastened on the cylinder head 3 of the front cylinder 2, bearing brackets 19 are disposed on the cross-member 5 on each side of the vehicle longitudinal axis and in parallel relationship thereto, with the pivot pins 21 thereof extending through appropriate bores in the brackets 20 secured to the fuel tank 10. The tank 10 can be swung forwardly about the common axis 21' of these two pivot pins 21. The tank 10 carries a strip or web 16 in the rear part of the base or bottom thereof which can be readily connected by means of a screw, bolt or the like 17, to another preferably U-shaped cross-member 18 which is bolted to the last cylinder head 3. A stay 22 may be provided to support the tank 10 in the raised position.

FIGURES 12 and 13 show an embodiment of the present invention wherein provisions are made for the fuel tank 10 to be swung laterally or pivoted to the side about a vertical axis in the form of a pivot or spindle or the like 26 connected to the vehicle whereby a support is advantageously provided to retain the tank reliably in its swung-out position.

FIGS. 4 to 7 show still another embodiment of the present invention wherein the fuel tank 10 is slidable forwardly in the longitudinal direction. To this end, rails 11 preferably of U-shape are disposed on the cross-members 5 with the apertures of the U-shape or the rail openings pointing, for example, outwardly and with U-shaped rails 12 fastened the other way round on the fuel tank 10 engaging in said apertures or openings. The top front part 14 of the bonnet is removable or, advantageously, rigidly secured to the fuel tank 10 so that it can be slid forwards with the latter (FIG. 7). This part 14 may also be constructed as a tank so that the fuel tank 10 is enlarged accordingly.

FIGURES 8 through 11 show a further embodiment of the present invention wherein the fuel tank 10 is mounted upon telescopically extensible parts 23 which are aligned in a direction transverse to the direction of motion of the tractor. In its normal position above the engine, as shown in FIGURE 9, the fuel tank is rigidly connected to the vehicle by means of conventional quick-action fasteners or the like 24, while the outward displaceability is limited by suitable stops 25. Other parts of the bonnet, or hood, for example, the side cover plates and/or particularly the front part containing the mesh for the access of cooling air and/or air for combustion, are advantageously connected to the ends of the cross-members 5, 18 by means of conventional quick-action fasteners or the like.

While I have shown and described several embodiments in accordance with the present invention it is understood the same is not limited thereto but is susceptible to numerous changes and modifications as known to a person skilled in the art and we therefore do not wish to be limited to the details disclosed and illustrated herein but intend to cover all such changes and modifications as are encompassed by the scope of the appended claims.

What is claimed is:

1. In a motor vehicle, especially a tractor having a power train including an engine having multiple cylinders and a transmission aligned longitudinally parallel to the direction of motion of the tractor, said engine and transmission being located forward of the rear axle of the tractor, a fuel tank structure, and support means movably supporting said tank structure on said vehicle above said power train, said support means including pivot pin means fixedly secured on said engine providing for rotation of said fuel tank about a horizontal axis, thus rendering said power train temporarily accessible.

2. In a motor vehicle, the combination according to claim 1, wherein said pivot axis extends substantially parallel to the longitudinal direction of the vehicle.

3. In a motor vehicle, the combination according to claim 1, wherein said pivot axis extends in a direction substantially transverse to the longitudinal direction of the vehicle.

4. In a motor vehicle, especially a tractor having a power train including an engine having multiple cylinders and a transmission aligned longitudinally parallel to the direction of motion of the tractor, said engine and transmission being located forward of the rear axle of the tractor, a fuel tank structure, and support means movably supporting said tank structure on said vehicle above said power train to tilt in the outward direction, including pivot pin means fixedly secured on said engine, said pivot pin means forming pivot axis extending essentially vertically, thus providing for the pivoting of the fuel tank structure laterally toward the outside of the motor vehicle, said support means including at least two transverse bearer means, and sectional reinforcing means on said tank structure operatively connected to said bearer means by said pin means.

5. In a motor vehicle, especially a tractor having a power train and a hood covering the power train, the power train including an engine having multiple cylinders and a transmission aligned longitudinally parallel to the direction of motion of the tractor, said engine and transmission being located forward of the rear axle of the tractor, a fuel tank structure, and support means moveably supporting said tank structure on said engine above said power train including pivot pin means and rail means fixedly secured on said engine, the upper portion of the fuel tank structure being matched to the contour of the engine hood and simultaneously forming a part of the engine hood.

6. In a motor vehicle, especially a tractor having a power train including an engine with multiple cylinders, in which the cylinder head is secured to the cylinder block by cylinder head bolts, and a transmission, said engine and transmission being located forward of the rear axle of the tractor and aligned longitudinally parallel to the direction of motion of the tractor, a fuel tank structure, and support means, including at least two transverse bearer means, movably supporting said tank structure above the engine, said support means thus enabling the parts of the engine disposed below the fuel tank structure to be made readily accessible temporarily by guided displacement of the fuel tank structure.

7. An arrangement according to claim 6, wherein said transverse bearer means are directly secured to the cylinder head of the engine by means of the cylinder head bolts.

8. An arrangement according to claim 6, further comprising reinforcing means on said fuel tank structure serving for the support of said fuel tank structure on said transverse bearer means, and connecting means connecting said reinforcing means with one of the two parts consisting of said bearer means and the engine.

9. In a motor vehicle the combination according to claim 8 wherein said reinforcing means are sectional members.

10. In a motor vehicle the combination according to claim 8 wherein said reinforcing means are webs.

11. In a motor vehicle the combination according to claim 8 wherein said connecting means are rigid fastening means, connecting said reinforcing means at a vehicle part.

12. In a motor vehicle the combination according to claim 8 wherein said connecting means includes pivot means pivotally connecting said reinforcing means at said transverse bearer means.

13. In a motor vehicle, especially a tractor having a power train including an engine having multiple cylinders and a transmission aligned longitudinally parallel to the direction of motion of the tractor, said engine and transmission being located forward of the rear axle of the tractor, a fuel tank structure, and support means moveably supporting said tank structure on said vehicle above a portion of the engine, and said support means including approximately horizontally arranged guide rails, and means moveably supporting said tank structure on said guide rails including abutment means limiting the movement of said tank structure and rapid fastening means for securing the tank structure in its normal position above the engine.

14. In a motor vehicle, the combination according to claim 13, wherein said tank structure is displaceable on said rail means substantially in the longitudinal direction of the vehicle.

15. In a motor vehicle, the combination according to claim 13, wherein said tank structure is displaceable on said rail means substantially in the transverse direction of the vehicle.

16. In a motor vehicle, the combination according to claim 13, wherein
said rail means includes telescopically extensible parts.

References Cited
UNITED STATES PATENTS

| | | | |
|---|---|---|---|
| 2,250,795 | 7/1941 | Fitz Gerald et al. | 180—69 X |
| 2,833,365 | 5/1958 | Kesl et al. | 180—69 |
| 3,265,148 | 8/1966 | Foxwell | 180—68.5 |

FOREIGN PATENTS

| | | |
|---|---|---|
| 927,909 | 5/1955 | Germany. |
| 706,270 | 3/1954 | Great Britain. |

BENJAMIN HERSH, *Primary Examiner.*

MILTON L. SMITH, *Assistant Examiner.*